United States Patent
Sasaki et al.

(10) Patent No.: US 9,975,572 B2
(45) Date of Patent: May 22, 2018

(54) IN-VEHICLE DEVICE CONTROLLER AND POWER STEERING DEVICE

(71) Applicant: HITACHI AUTOMOTIVE SYSTEMS, LTD., Hitachinaka-shi, Ibaraki (JP)

(72) Inventors: Mitsuo Sasaki, Hadano (JP); Takumi Hisazumi, Atsugi (JP)

(73) Assignee: HITACHI AUTOMOTIVES SYSTEMS, LTD., Hitachinaka-Shi (JP)

(*) Notice: Subject to any disclaimer, the term of this patent is extended or adjusted under 35 U.S.C. 154(b) by 134 days.

(21) Appl. No.: 15/111,237

(22) PCT Filed: Feb. 5, 2015

(86) PCT No.: PCT/JP2015/053188
§ 371 (c)(1),
(2) Date: Jul. 13, 2016

(87) PCT Pub. No.: WO2015/125617
PCT Pub. Date: Aug. 27, 2015

(65) Prior Publication Data
US 2016/0332660 A1 Nov. 17, 2016

(30) Foreign Application Priority Data
Feb. 24, 2014 (JP) ................. 2014-032397

(51) Int. Cl.
*G06F 19/00* (2018.01)
*B62D 5/04* (2006.01)
(Continued)

(52) U.S. Cl.
CPC .......... *B62D 5/0493* (2013.01); *B62D 5/046* (2013.01); *B62D 5/0484* (2013.01); *B62D 6/002* (2013.01); *B62D 6/10* (2013.01)

(58) Field of Classification Search
CPC .... B62D 5/0493; B62D 5/046; B62D 5/0484; B62D 6/002; B62D 6/10
(Continued)

(56) References Cited

U.S. PATENT DOCUMENTS 5,457,632 A * 10/1995 Tagawa ............. B62D 6/04
180/446
5,801,504 A * 9/1998 Endo ............... B62D 5/046
318/293
(Continued)

FOREIGN PATENT DOCUMENTS

JP 2524450 Y2 9/1987
JP 11-078924 A 3/1999
(Continued)

*Primary Examiner* — Ronnie Mancho
(74) *Attorney, Agent, or Firm* — Foley & Lardner LLP

(57) ABSTRACT

An in-vehicle device controller has at least two redundant operating condition detection units. Under normal circumstances, the controller performs actuator drive control based on an operating condition detection signal of one of the operating condition detection units. Upon detection of an abnormality in the signal transmission state, data state or operating status of one of the at least two operating condition detection units, the controller performs actuator drive control based on an operating condition detection signal of another one of the at least two operating condition detection units in which no abnormality is present. By this control, the actuator function is preserved even in the event of the abnormality in the operating condition detection unit or operating condition detection signal.

14 Claims, 16 Drawing Sheets

(51) Int. Cl.
*B62D 6/00* (2006.01)
*B62D 6/10* (2006.01)

(58) Field of Classification Search
USPC ...................................................... 701/1, 43
See application file for complete search history.

(56) References Cited

U.S. PATENT DOCUMENTS

| | | | | |
|---|---|---|---|---|
| 6,397,969 | B1* | 6/2002 | Kasai | B62D 5/0481 180/404 |
| 2005/0150712 | A1 | 7/2005 | Tokumoto | |
| 2005/0156548 | A1 | 7/2005 | Kawada | |
| 2005/0235744 | A1* | 10/2005 | Ogawa | B60C 23/001 73/146 |
| 2006/0125439 | A1* | 6/2006 | Ajima | B60K 6/26 318/716 |
| 2007/0288142 | A1* | 12/2007 | Maeda | B62D 1/286 701/41 |
| 2007/0288144 | A1* | 12/2007 | Arima | B62D 5/0481 701/41 |
| 2008/0035411 | A1 | 2/2008 | Yamashita et al. | |
| 2008/0234897 | A1* | 9/2008 | Tsuchida | B60W 50/029 701/42 |
| 2010/0114449 | A1* | 5/2010 | Shiozawa | B60L 3/10 701/90 |
| 2010/0299027 | A1 | 11/2010 | Aoki | |
| 2011/0282551 | A1* | 11/2011 | Sasaki | B62D 5/0463 701/42 |
| 2012/0290188 | A1* | 11/2012 | Oishi | B60T 7/042 701/99 |
| 2013/0060412 | A1* | 3/2013 | Nakagawara | B60T 1/005 701/22 |
| 2013/0197757 | A1* | 8/2013 | Ellis | B62D 6/007 701/41 |
| 2013/0226410 | A1* | 8/2013 | Narita | B60T 8/1764 701/41 |

FOREIGN PATENT DOCUMENTS

| | | |
|---|---|---|
| JP | 2005-186759 A | 7/2005 |
| JP | 2006-248354 A | 9/2006 |
| JP | 2007-190985 A | 8/2007 |
| JP | 2008-037399 A | 2/2008 |
| JP | 2009-012511 A | 1/2009 |
| JP | 2009-071926 A | 4/2009 |
| JP | 2010-132253 A | 6/2010 |
| JP | 2011-051409 A | 3/2011 |
| WO | WO-03/078237 A1 | 9/2003 |

* cited by examiner

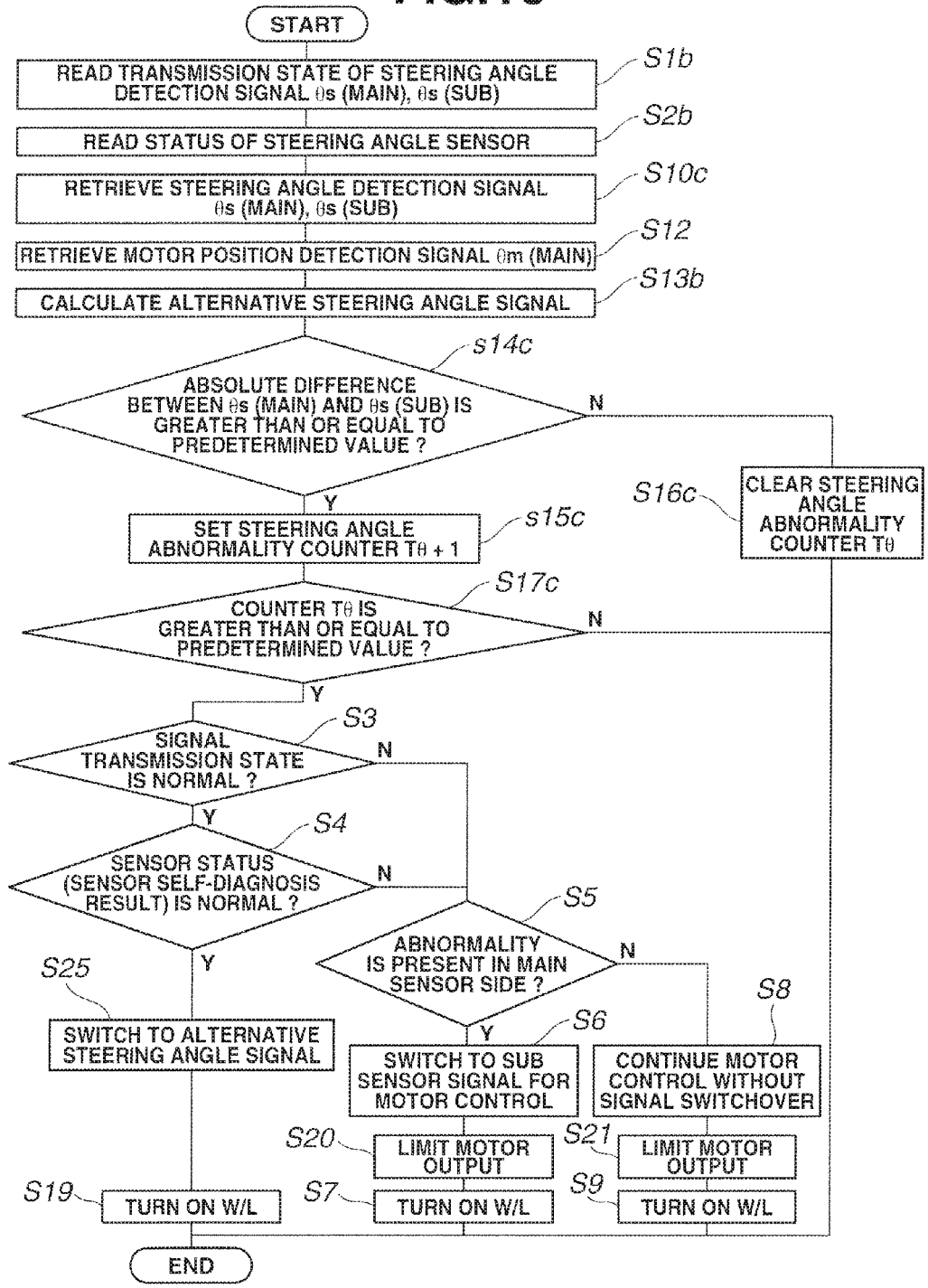

IN-VEHICLE DEVICE CONTROLLER AND POWER STEERING DEVICE

FIELD OF THE INVENTION

The present invention relates to an in-vehicle device controller and a power steering device.

BACKGROUND ART

With the recent widespread use of EPS devices, further improvement of product appeal is desired. It is particularly demanded to, in the event of a failure in an EPS device, preserve the actuator function such as steering assist function of the EPS device even for a limited time.

Patent Document 1 discloses a technique to preserve the actuator function of an EPS device.

PRIOR ART DOCUMENTS

Patent Document

Patent Document 1: Japanese Laid-Open Patent Publication No. 2005-186759

SUMMARY OF THE INVENTION

It is however a problem for an in-vehicle device controller to preserve the function of an actuator in the event of an abnormality in a vehicle operating condition detection unit or operating condition detection signal.

The present invention has been made in view of the above problem.

According to one aspect of the present invention, there is provided a controller of an in-vehicle device with an actuator, the controller having at least two redundant-type operating condition detection units and being configured to: under normal circumstances, perform drive control of the actuator in accordance with an operating condition detection signal of one of the at least two operating condition detection units; and to, upon detection of an abnormality in the transmission state or data state of the operating condition detection signal of the one of the at least two operating condition detection units or in the status of the one of the at least two operating condition detection units, perform drive control of the actuator in accordance with an operating condition detection signal of another one of the at least two operating condition detection units.

In the present invention, it is possible for the in-vehicle device controller to preserve the function of the actuator even in the event of an abnormality in the operating condition detection unit or operating condition detection signal.

BRIEF DESCRIPTION OF DRAWINGS

FIG. 16 is a flowchart of a signal abnormality detection process of the power steering device according to the fourth embodiment of the present invention.

DESCRIPTION OF EMBODIMENTS

Hereinafter, in-vehicle device controllers according to first to fourth embodiments of the present invention will be described in detail below with reference to FIGS. 1 to 16.

[First Embodiment]

Figure 1:
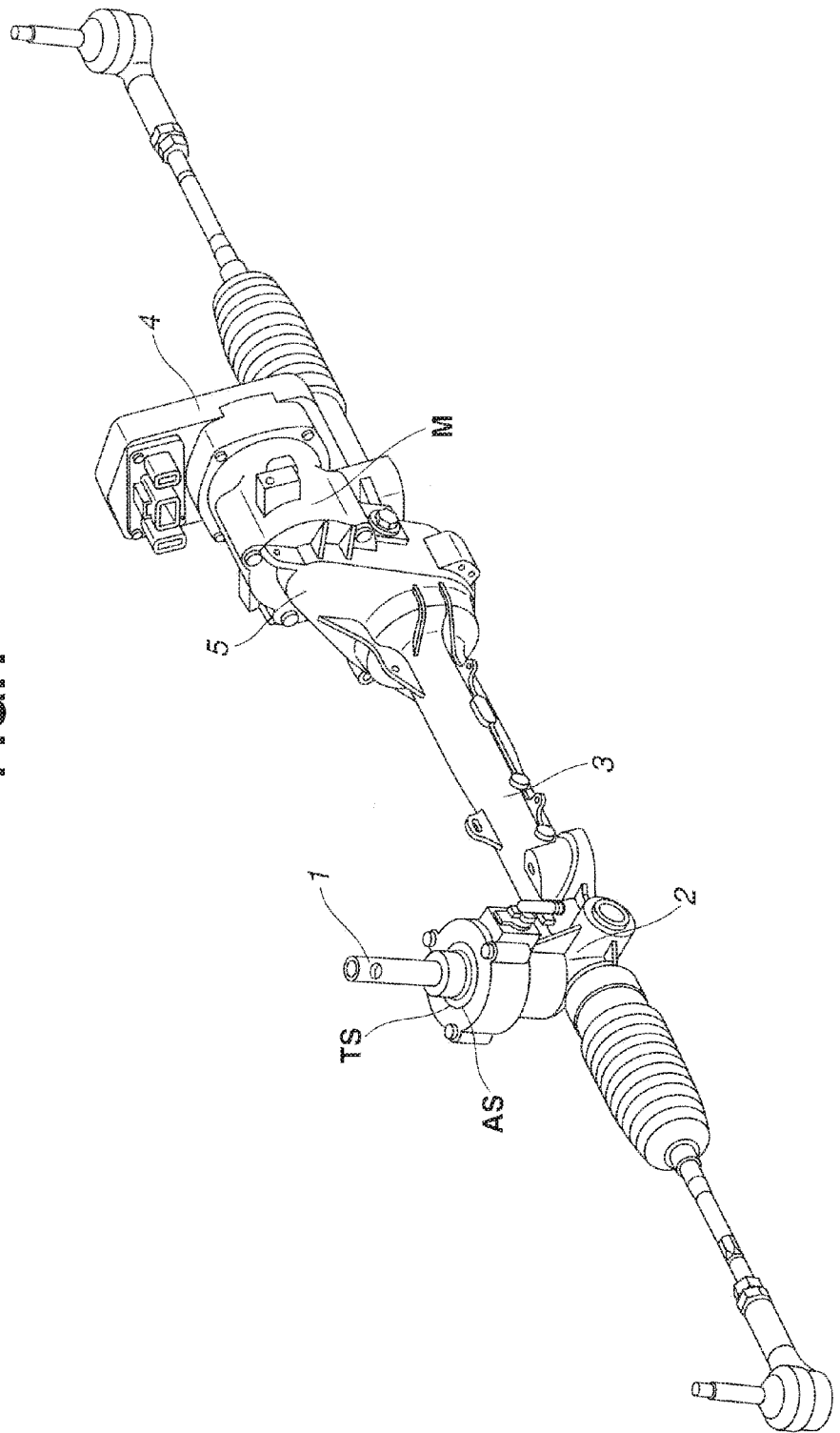
FIG. 1 is a schematic view of a power steering device according to a first embodiment of the present invention.

FIG. 1 is a schematic view of a power steering device as an application example of the in-vehicle device controller according to the first embodiment of the present invention.

As shown in FIG. 1, the power steering device has a basic steering system, as an actuator, including a steering wheel (not shown), a steering shaft 1, a pinion shaft 2 and a rack shaft 3 so as to, when the steering wheel is turned by a driver, transmit a steering torque of the steering wheel to the pinion shaft 2 via the steering shaft 1, convert the rotation of the pinion shaft 2 to linear movement of the rack shaft 3 and thereby steer left and right steerable vehicle wheels (not shown) connected to both ends of the rack shaft 3. Namely, the rack shaft 3 has rack teeth engaged with the pinion shaft 2 such that the engagement of the rack teeth and the pinion shaft constitutes a conversion mechanism to convert the rotation of the steering shaft 1 to steering operation.

A steering torque sensor TS (such as resolver) is disposed on a housing of the pinion shaft 2 as a steering condition detection system to detect a steering angle of the steering wheel. A motor position sensor 6 (such as resolver or IC) is disposed as a steering condition detection system to detect a rotor rotational position of an electric motor M. Based on output signals of the steering torque sensor T and the motor position sensor 6 as well as vehicle speed information, the electric motor M is driven and controlled by a motor control circuit of a control unit (hereinafter also referred to as "ECU") 4 to apply a steering assist torque from the electric motor M to the rack shaft 3 via a reduction gear 5.

As the reduction gear 5 is disposed on an output shaft of the electric motor M, the torque of the electric motor M is reduced by the reduction gear 5 and converted to the linear movement of the rack shaft 3.

Herein, the steering shaft 1 has axially separable shaft members: an input shaft member on the steering wheel side and an output shaft on the rack shaft 3 side. The input and output shaft members are coaxially coupled together via a torsion bar (not shown) and are rotatable relative to each other by torsion of the torsion bar. In the first embodiment, the steering torque sensor TS has each sensor unit equipped with first and second angle sensor elements to detect a rotational angle of the input shaft member and a rotational angle of the output shaft member, respectively, calculate the amount of torsion of the torsion bar based on first and second steering condition signals of the first and second angle sensor elements and determine the steering torque according to the calculated torsion amount.

A steering angle sensor AS (such as MR element or IC) is also disposed on the torsion bar as a steering condition detection system.

Figure 2:
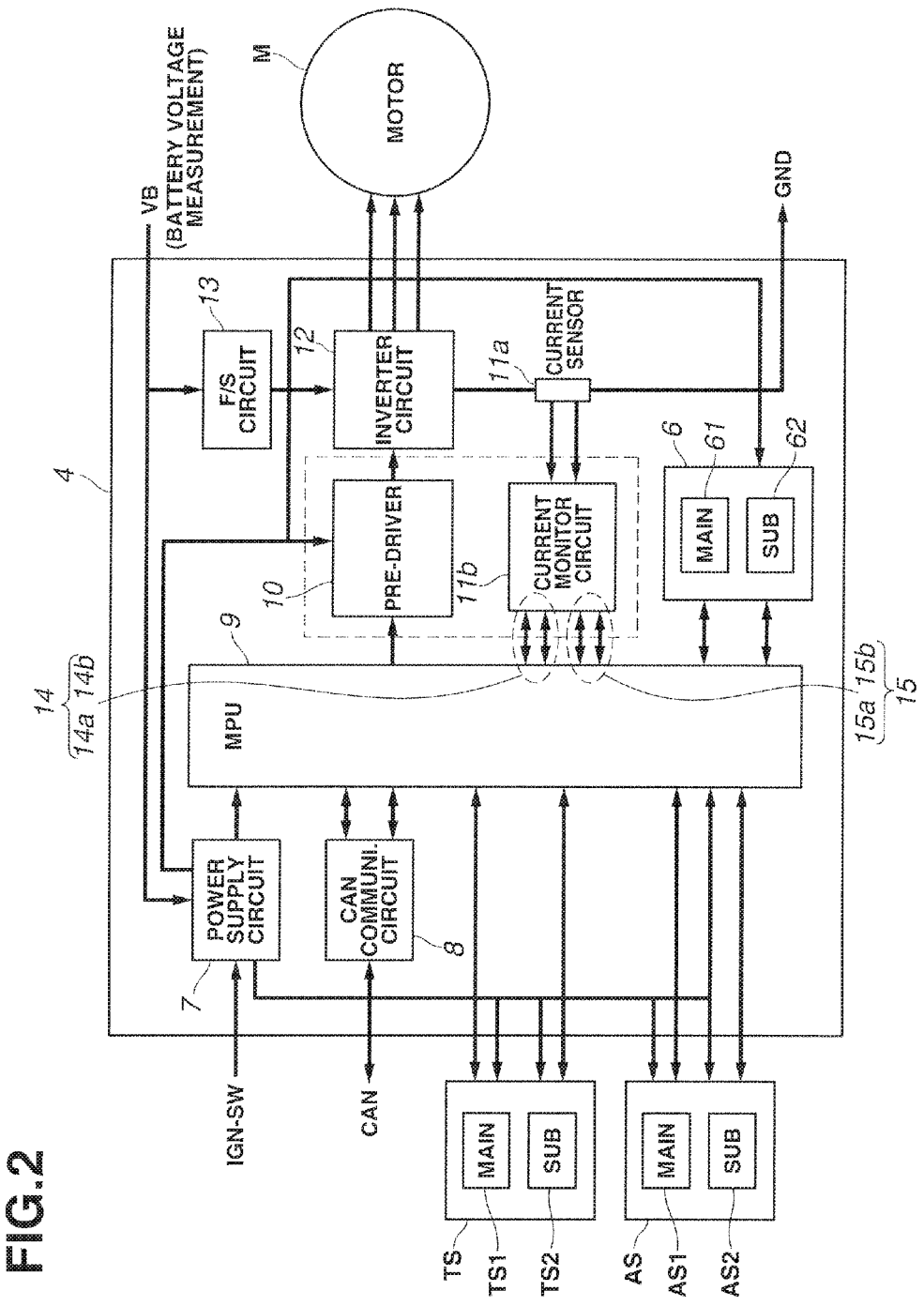
FIG. 2 is a block diagram of an electric system of the power steering device according to the first embodiment of the present invention.
Figure 3:
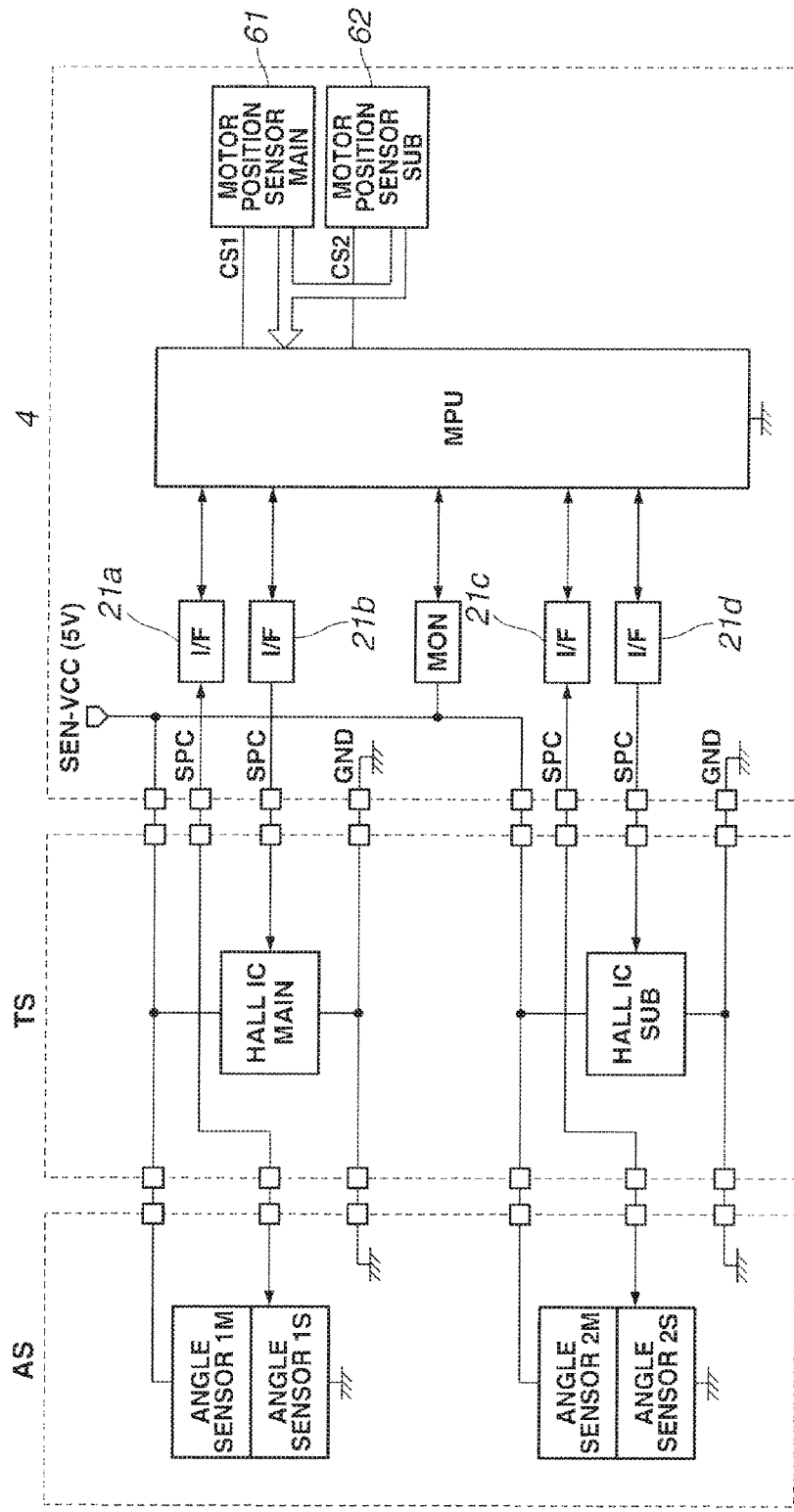
FIG. 3 is a schematic diagram showing inputs and outputs of a steering torque sensor and a steering angle sensor of the power steering device according to the first embodiment of the present invention.

FIG. 2 is a block diagram of an electric system of the power steering device. FIG. 3 is a schematic diagram showing inputs and outputs of the steering torque sensor TS, the steering angle sensor AS and the motor position sensor 6.

As shown in FIG. 3, the ECU 4 has steering condition detection signal receivers 21a to 21d that receive, as first and second steering condition detection signals, pairs of serial data signals outputted from the steering condition detection systems. Each pair of serial data signals may be detection signals detected by different detection elements or may be detection signals detected by a common detection elements and outputted through different electronic circuits.

More specifically, two main and sub steering torque sensor units TS1 and TS2, two main and sub steering angle sensor units AS1 and AS2 and two main and sub motor position sensor units 61 and 62 are provided as first and second steering condition detection units so as to respectively detect the steering torque, the steering angle and the motor position and output, as the first and second steering condition detection signals, steering torque detection signals Tt(Main) and Tt(Sub), steering angle detection signals θs(Main) and θs(Sub) and motor position detection signals θm(Main) and θm(Sub) to the steering condition detection signal receivers, that is, the steering torque detection signal receiver 21b and 21d, the steering angle detection signal receivers 21a and 21c and the motor position detection signal receivers (not specifically shown) of the ECU 4 as shown in FIGS. 2 and 3.

Further, abnormality judgment circuits are provided in the steering torque sensor units TS1 and TS2, the steering angle sensor units AS1 and AS2 and the motor position sensor units 61 and 62 so as to respectively judge the presence or absence of abnormalities in the steering torque detection signals Tt(Main) and Tt(Sub), the steering angle detection signals θs(Main) and θs(Sub) and the motor position detection signals θm(Main) and θm(Sub) and, upon detection of abnormalities in the detection signals, output these detection signals with abnormality data contained therein.

As shown in FIG. 2, a power supply circuit 7 is provided as a power source to supply power to the sensors, MPU 9, IC and the like. A CAN communication circuit 8 is provided to perform data/information communication with the vehicle. The MPU 9 is arranged to perform various processing such as EPS assist control, motor current control, functional element abnormality detection and transition to safe state. A fail-safe circuit 13 is provided to, when the MPU 9 detects any abnormality and decides on the necessity for system shutdown, shut down the motor current source according to a command from the MPU 9.

A drive circuit 10 is arranged to drive an inverter circuit 12 according to a command from the MPU 9. The inverter circuit 12 has a driver element driven according to a command from the drive circuit 10. By the current flow from the inverter circuit 12, the electric motor M is driven to output the motor torque for steering assist. Current sensors 11a and 11b are provided as current detection elements so as to detect the current at the downstream side of the inverter circuit 12.

For motor control, main and sub current detection circuits 14a and 14b are provided so as to detect the current after high-response filtering. For monitoring of overcurrent in the inverter circuit 12, main and sub current detection circuits 15a and 15b are provided so as to detect the average current after low-response filtering.

Figure 4:
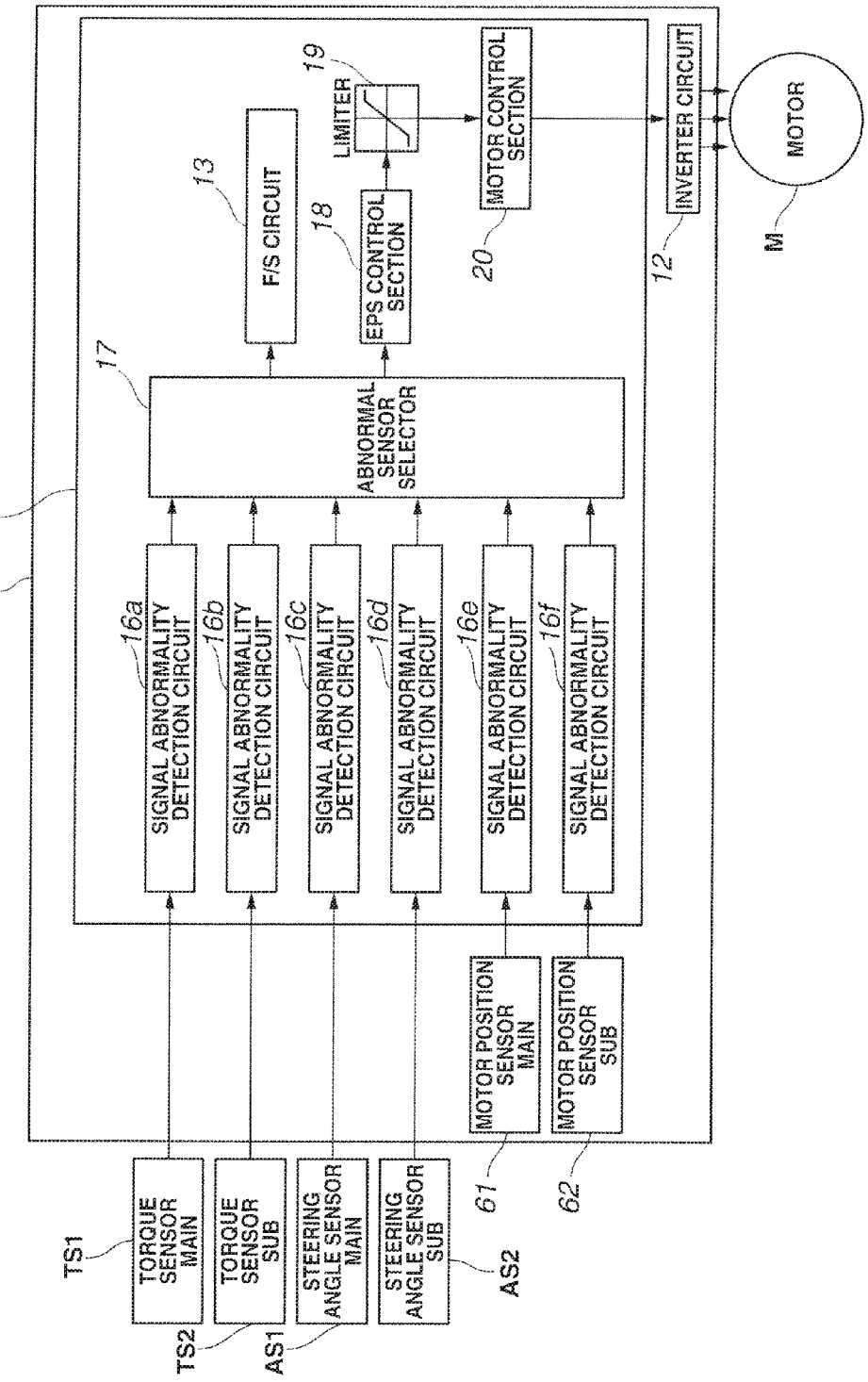
FIG. 4 is a control block diagram of the power steering device according to the first embodiment of the present invention.

FIG. 4 is a block diagram of the ECU 4 in the first embodiment. As shown in FIG. 4, the ECU 4 includes signal abnormality detection circuits 16a to 16f that judge the presence or absence of an abnormality in any of the first and second steering condition detection signals (steering torque detection signals Tt(Main) and Tt(Sub), steering angle detection signals θs(Main) and θs(Sub) and motor position detection signals θm(Main) and θm(Sub)). The ECU 4 further includes an abnormal sensor selector circuit 17 that selects the abnormal steering condition sensor unit based on the judgment results of the signal abnormality detection circuits 16a to 16f and switches the signal of the abnormal steering condition sensor unit to a backup signal, the fail-safe circuit 13, an EPS control section 18 that outputs a torque command based on the steering condition detection signals, a limiter 19 that limits the torque command in the event of any abnormality in the steering condition detection signal and a motor control section 20 that controls the motor according to the torque command.

In the first embodiment, the steering torque detection signals Tt(Main) and Tt(Sub), the steering angle detection signals θs(Main) and θs(Sub) and the motor position detection signals θm(Main) and θm(Sub) are in the form of serial data signals each containing data about the steering condition between a trigger pulse indicating a start of signal transmission and an end pulse indicating an end of signal transmission.

The transmission of the serial data signals can be performed by SPC (Short PWM Codes) communication or SPI (Serial Peripheral Interface) communication.

Figure 5:
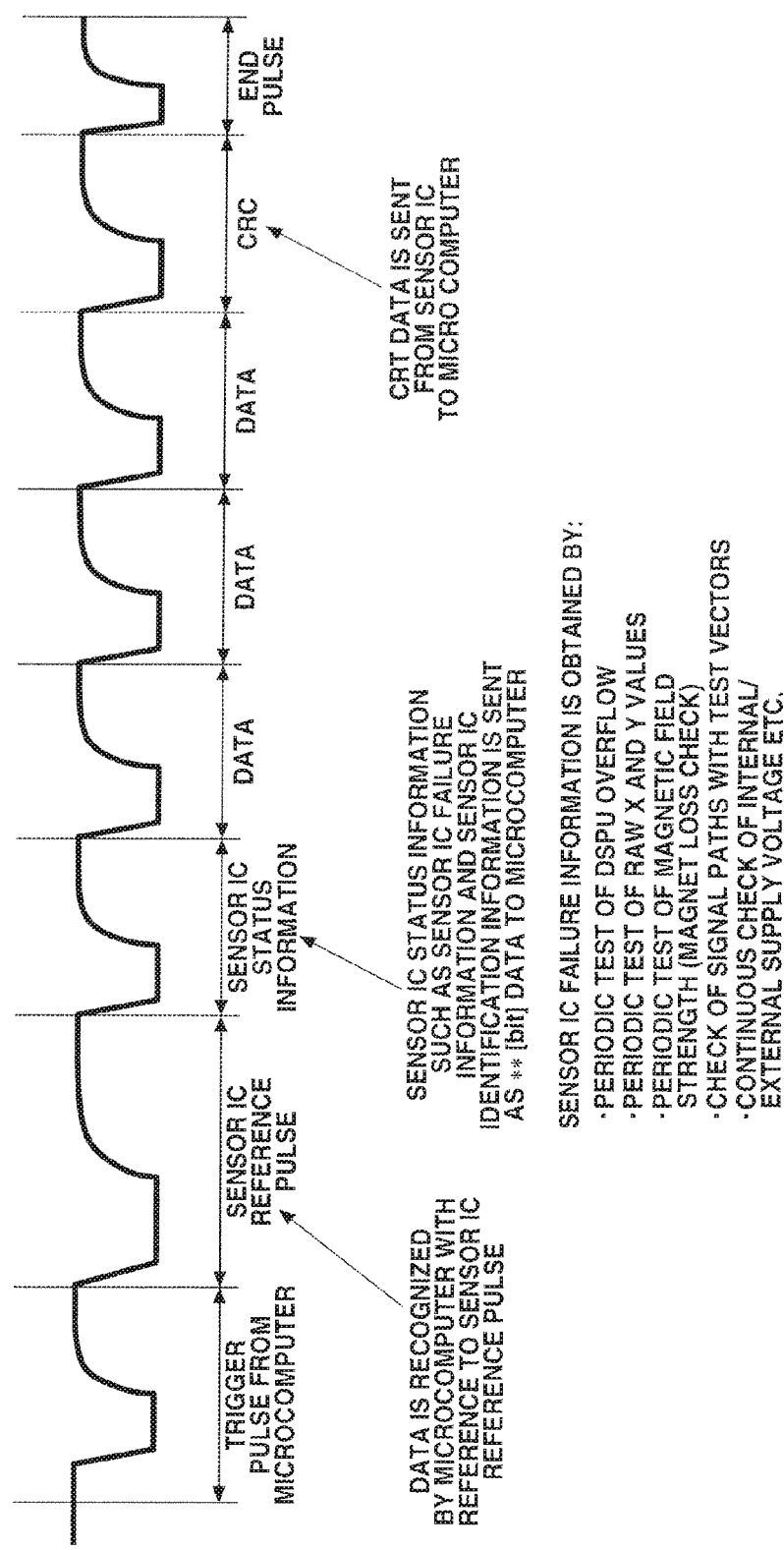
FIG. 5 is a schematic view showing an example of SPC communication.

As shown in FIG. 5, the SPC communication signal contains a trigger pulse from a microcomputer, a reference pulse of a sensor IC, sensor IC status information, data, CRC data and an end pulse.

In the SPC communication, the data is recognized by the microcomputer with reference to the reference pulse of the sensor IC. The sensor IC status information such as sensor IC failure information, sensor IC identification information etc. is sent to the microcomputer. Herein, examples of the IC failure information are diagnosis results obtained by periodic test of DSPU overflow, periodic test of raw X and Y values, periodic test of applicable magnetic field strength (magnet loss check), check of signal paths with test vectors, continuous check of internal/external supply voltage and the like.

Figure 6:
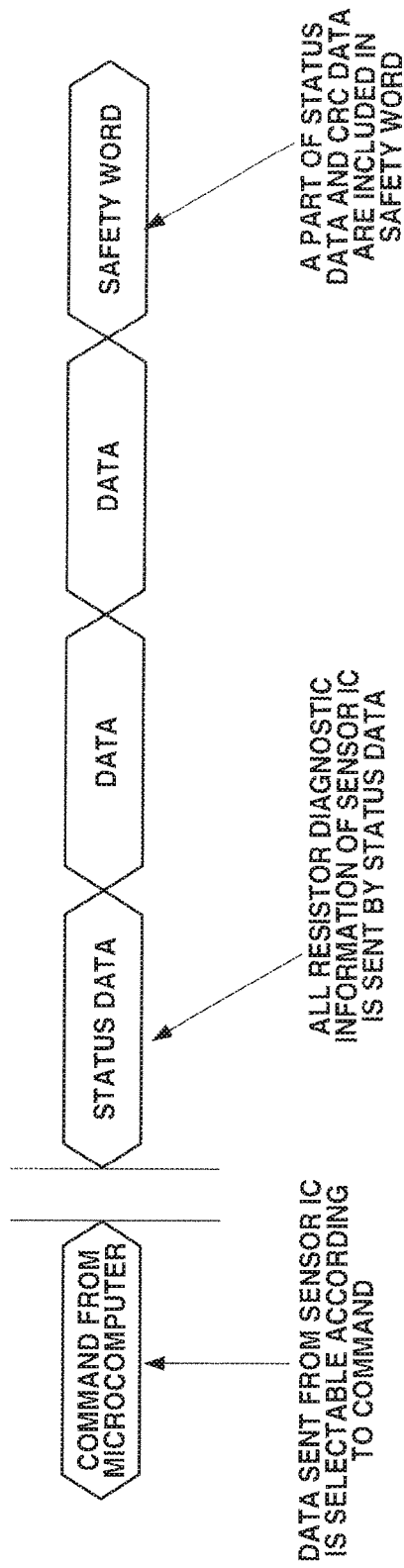
FIG. 6 is a schematic view showing an example of SPI communication.

As shown in FIG. 6, the SPI communication signal contains a command from a microcomputer, status data, data and a safety word. In the SPI communication, the data sent from the sensor IC is selectable according to the command from the microcomputer. All resistor diagnostic information of the sensor IC is sent by the status data. A part of the status data and CRC data are included in the safety word.

Upon receipt of the steering torque detection signals Tt(Main) and Tt(Sub), the steering angle detection signals θs(Main) and θs(Sub) and the motor position detection signals θm(Main) and θm(Sub) through the steering condition detection signal receivers 21a to 21d, the signal abnormality detection circuits 16a to 16f detect whether any abnormality is present in the steering torque detection signals Tt(Main) and Tt(Sub), the steering angle detection signals θs(Main) and θs(Sub) and the motor position detection signals θm(Main) and θm(Sub), respectively.

The signal abnormality detection circuit 16a to 16f detects the abnormality in the steering torque detection signal Tt(Main), Tt(Sub), the steering angle detection signal θs(Main), θs(Sub) or the motor position detection signal θm(Main), θm(Sub) in the case where the sensor abnormality data, which indicates the presence of the abnormality in the steering condition sensor unit, is contained in the steering torque detection signal Tt(Main), Tt(Sub), the steering angle detection signal θs(Main), θs(Sub) or the motor position detection signal θm(Main), θm(Sub). The signal abnormality detection circuit 16a to 16f also detects the abnormality in the steering torque detection signal Tt(Main), Tt(Sub), the steering angle detection signal θs(Main), θs(Sub) or the motor position detection signal θm(Main), θm(Sub) in the case where the steering condition data is missing or is out of sequence in the steering torque detection signal Tt(Main), Tt(Sub), the steering angle detection signal θs(Main), θs(Sub) or the motor position detection signal θm(Main), θm(Sub).

When the abnormality in the steering torque detection signal Tt(Main), Tt(Sub), the steering angle detection signal θs(Main), θs(Sub) or the motor position detection signal θm(Main), θm(Sub) is detected by the signal abnormality detection circuit 16a to 16f, the abnormal sensor selector circuit 17 identifies the abnormal steering condition sensor unit in which the abnormality is present. When the identified abnormal steering condition sensor unit is the main sensor unit (steering torque sensor unit TS1, steering angle sensor unit AS1, motor position sensor unit 61), the abnormal sensor selector circuit 17 switches from the steering condition detection signal of such an abnormal main sensor unit to the steering condition detection signal of the sub sensor unit (torque sensor TS2, steering angle sensor AS2, motor position sensor 62) so that the motor control can be performed in accordance with the detection signal of the sub sensor unit.

In the first embodiment, the abnormal sensor selector circuit 17 compares the first and second steering condition detection signals by redundancy monitoring for detection of the abnormality in the first and second steering condition detection signals.

Figure 7:
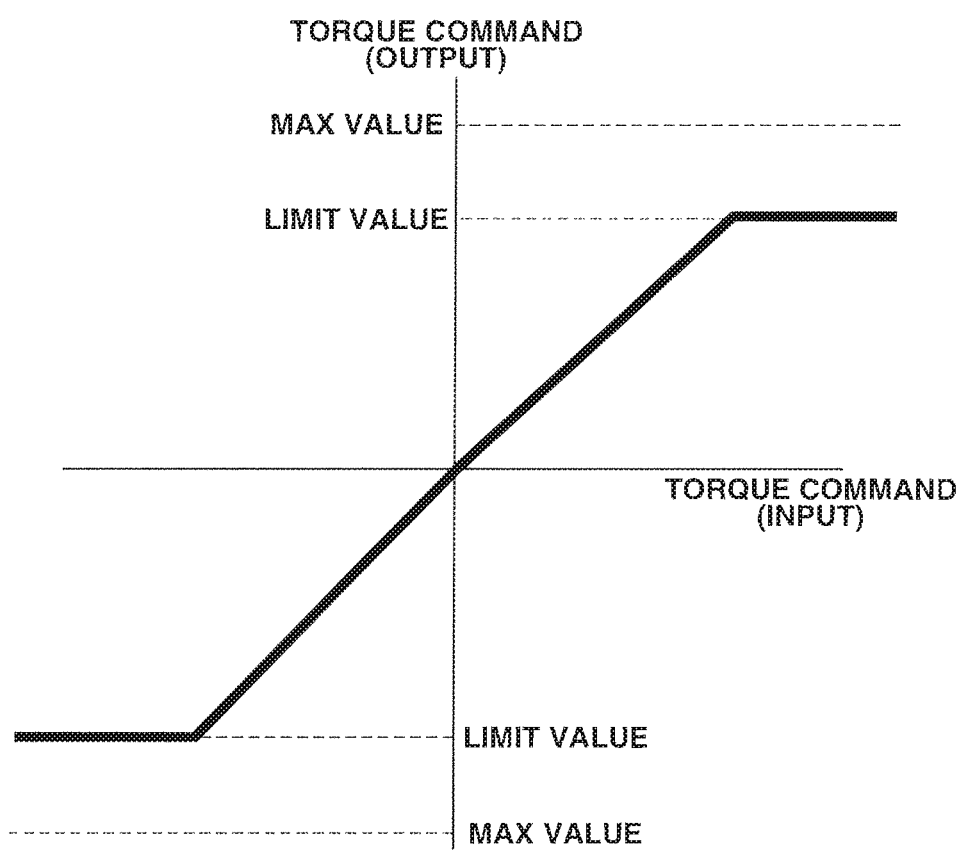
FIG. 7 is a graph showing a torque command after limiter processing in the power steering device according to the first embodiment of the present invention.

FIG. 7 is a graph showing an example of the torque command under assist limit control by the limiter 19. Under normal circumstances, the limiter 19 outputs the torque command as it is inputted. When the abnormality in the steering condition detection signal is detected by the signal abnormality detection circuit 16a to 16b, the limiter 19 performs assist limit control. In the assist limit control, the output value of the torque command is limited to a predetermined limit value in the case where the input value of the torque command is greater than the limit value as shown in FIG. 7.

Figure 8:
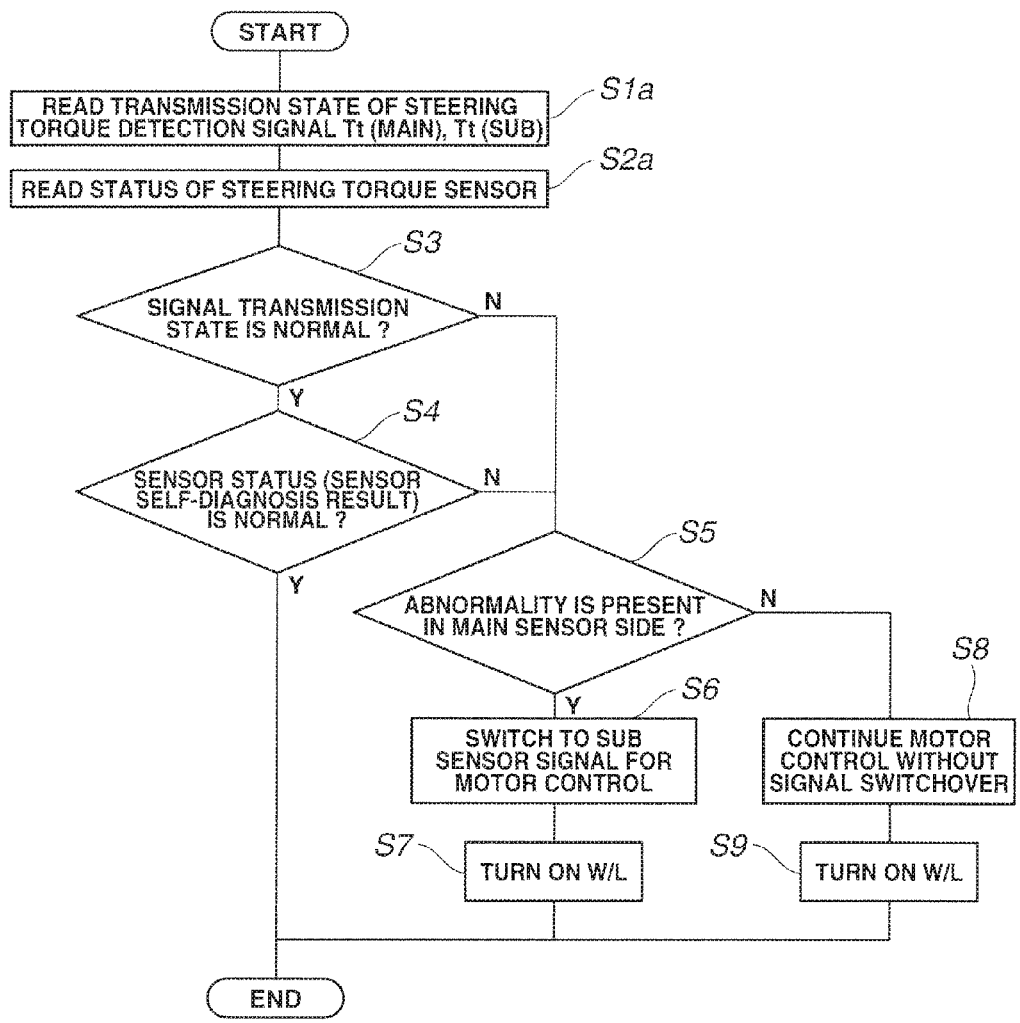
FIG. 8 is a flowchart of a signal abnormality detection process (steering torque signal abnormality detection) of the power steering device according to the first embodiment of the present invention.

Next, the control process of the power steering device according to the first embodiment will be explained below with reference to a flowchart of FIG. 8. FIG. 8 shows detection of abnormality in the steering torque sensor unit TS1, TS2 or the steering torque detection signal Tt(Main), Tt(Sub).

As shown in FIG. 8, the signal abnormality detection circuits 16a and 16b read the transmission state of the steering torque detection signals Tt(Main) and Tt(Sub) at step S1a.

At step S2a, the signal abnormality detection circuits 16a and 16b read the status of the steering torque sensor units TS1 and TS2 from the steering torque detection signals Tt(Main) and Tt(Sub).

At step S3a, the signal abnormality detection circuits 16a and 16b check whether the transmission state of the steering torque detection signals Tt(Main) and Tt(Sub) is normal or not. When the transmission state of the steering torque detection signals is normal, the process goes to step 84. When the transmission state of the steering torque detection signal is not normal, the process goes to step 85.

When the transmission state of the steering torque detection signals is normal, the signal abnormality detection circuits 16a and 16b check at step S4 whether the status of the steering torque sensor units TS1 and TS2 is normal or not. Since the self-diagnosis result of the steering torque sensor unit TS1, TS2 is contained in the steering torque detection signal Tt(Main), Tt(Sub), the status of the steering torque sensor unit TS1, TS2 can be checked based on the steering torque detection signal Tt(Main), Tt(Sub). When the status of the steering torque sensor units TS1 and TS2 is normal, the process ends the current control cycle. When the status of the steering torque sensor unit TS1, TS2 is not normal, the process goes to step S5.

When the transmission state of the steering torque detection signal is not normal or when the status of the steering torque sensor unit TS1, TS2 is not normal, the abnormal sensor selector circuit 17 checks at step S5 whether the abnormality is present in the main steering torque sensor unit TS1 or its steering torque detection signal Tt(Main). When the abnormality is present in the main steering torque sensor unit TS1 or its steering torque detection signal Tt(Main), the process goes to step S6. When the abnormality is present in the sub steering torque sensor unit TS2 or its steering torque detection signal Tt(Sub), the process goes to step S8.

When the abnormality is present in the main steering torque sensor unit TS1 or its steering torque detection signal Tt(Main), the abnormal sensor selector circuit 17 selects the use of the sub steering torque sensor unit TS2 for the steering assist control at step S6.

At step S7, the fail-safe circuit 13 turns on a warning lamp so as to inform the driver of the presence of the abnormality.

When the abnormality is present in the sub steering torque sensor unit TS2 or its steering torque detection signal Tt(Sub), the steering assist control is continued as it is without signal switchover at step S8. At step S9, the fail-safe circuit 13 turns on the warning lamp so as to inform the driver of the presence of the abnormality.

Figure 9:
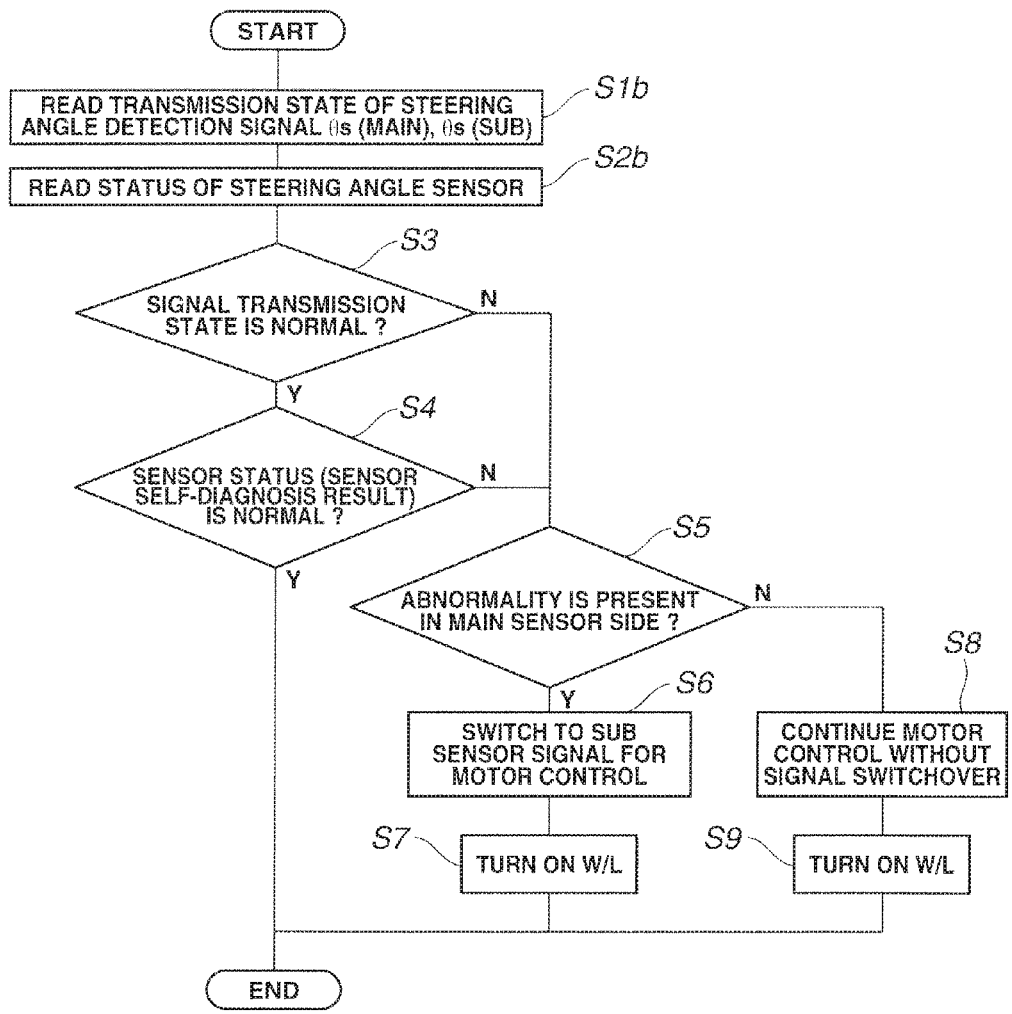
FIG. 9 is a flowchart of a signal abnormality detection process (steering angle signal abnormality detection) of the power steering device according to the first embodiment of the present invention.
Figure 10:
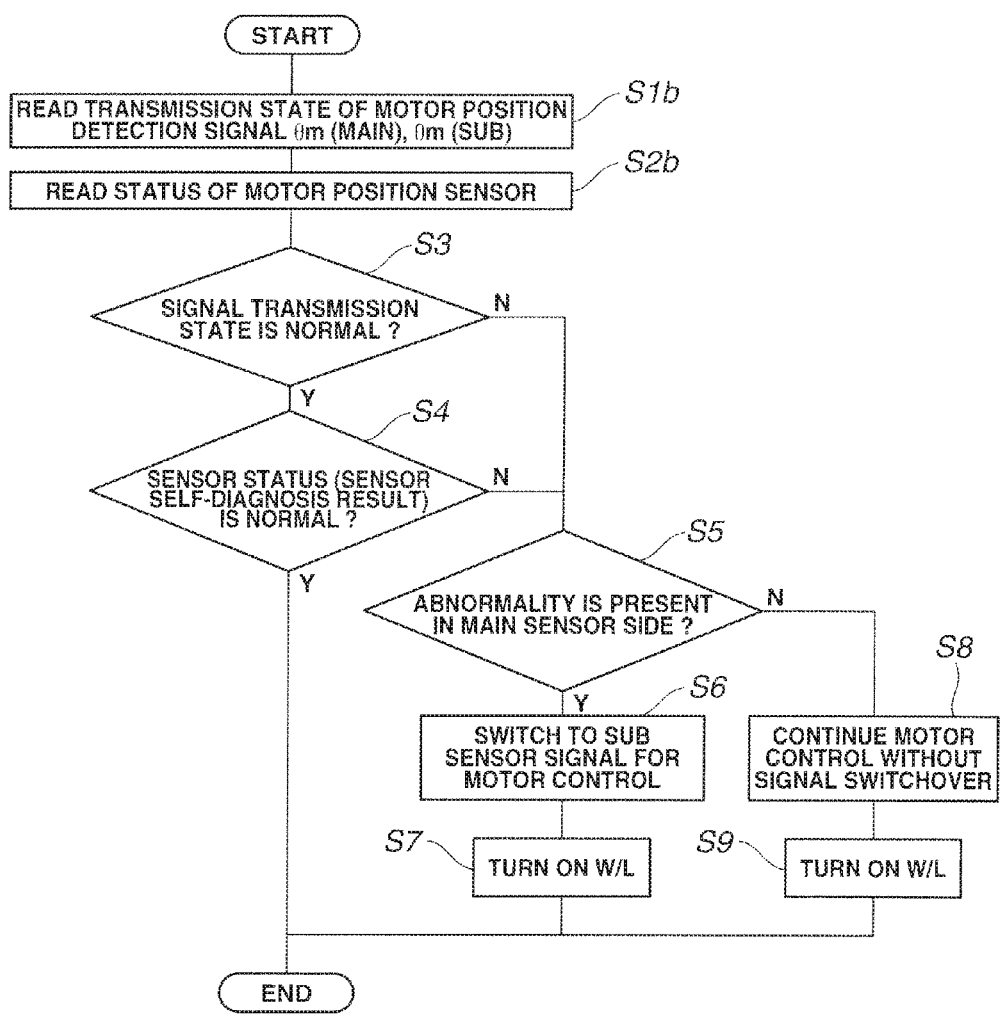
FIG. 10 is a flowchart of a signal abnormality detection process (motor position signal abnormality detection) of the power steering device according to the first embodiment of the present invention.

FIGS. 9 and 10 show detection of abnormality in the steering angle sensor units AS1 and AS2, the motor positions 61 and 62 and their steering condition detection signals. The processes of FIGS. 9 and 10 are similar to that of FIG. 8, except that: the transmission state of the steering angle detection signals and the status of the steering angle sensor units AS1 and AS2 are read at steps S1*b* and S2*b* in FIG. 9; and the transmission state of the motor position detection signals and the status of the motor position sensor units 61 and 62 are read at steps S1*c* and S2*c* in FIG. 10. Explanation of the processes of FIGS. 9 and 10 will be hence omitted herefrom.

In the flowcharts of FIGS. 8 to 10, the output steering assist torque is not limited in the case where the abnormality is present in the signal transmission state or sensor status. It is however alternatively feasible to limit the output steering assist torque at step S6, S8 as shown in FIG. 4.

As described above, the power steering device of the first embodiment is characterized in that, when the data indicating the presence of the abnormality in the steering condition sensor unit is contained in the first or second steering condition detection signal, the signal abnormality detection circuit 16*a* to 16*f* detects such a sensor abnormality.

The steering condition detection signal is in the form of a serial data signal in which a given set of data items is transmitted in a predetermined sequence. It is thus possible to detect the abnormality in the steering condition sensor unit, the steering condition detection signal or the signal transmission circuit (such as pin or interface) by monitoring the presence/absence and sequence of the data items.

In the event of the abnormality in the steering condition sensor unit or the transmission of the steering condition detection signal, the abnormal sensor selector circuit 17 accurately identifies the steering condition sensor unit or detection signal in which the abnormality is present and switches over the signal as needed for the steering assist control. It is thus possible to reduce driver's load in the event of the abnormality.

Since the abnormality is detected by not only checking the respective steering condition detection signals but also comparing the steering condition detection signals to each other, it is possible to increase the accuracy of detection of the abnormality.

The redundancy monitoring of the first and second steering condition detection signals cannot be done in the case where the abnormality is present in at least one of the first and second steering condition detection signals. For this reason, the power steering device is configured to limit the output value of the torque command upon detection of the abnormality in one of the steering condition detection signals. It is thus possible to improve steering safety. It is also possible to clearly inform the driver of the abnormal system state by limiting the maximum motor torque in the assist torque output stage and thereby increasing the overall steering force.

Patent Document 1 discloses the technique in which, when an abnormality is detected in a signal, the actuator function of the EPS device is preserved by switching from such an abnormal signal to an alternative signal. However, the technique of Patent Document 1 tends to be high in cost due to the reasons that the alternative signal is low in accuracy and is in need of signal adjustment e.g. correction.

In the first embodiment, by contrast, the first and second steering condition detection signals of the two equivalent sensor units are utilized to perform the function of monitoring the transmission state and data state of the steering condition detection signal and the status of the sensor unit itself such that, in the presence of the abnormality in one of the steering condition detection signals, the abnormal one of the steering condition detection signals is switched to the other steering condition detection signal. It is thus possible to achieve cost reduction.

[Second Embodiment]

A power steering device according to the second embodiment of the present invention will be explained below. The second embodiment is similar to the first embodiment, except for the configurations of the ECU 4. Duplicate explanation will be hence omitted herefrom. In the second embodiment, the presence or absence of an abnormality in the first and second steering torque sensor units TS1 and TS2 and the steering torque detection signals Tt(Main) and Tt(Sub) is detected.

Figure 11:
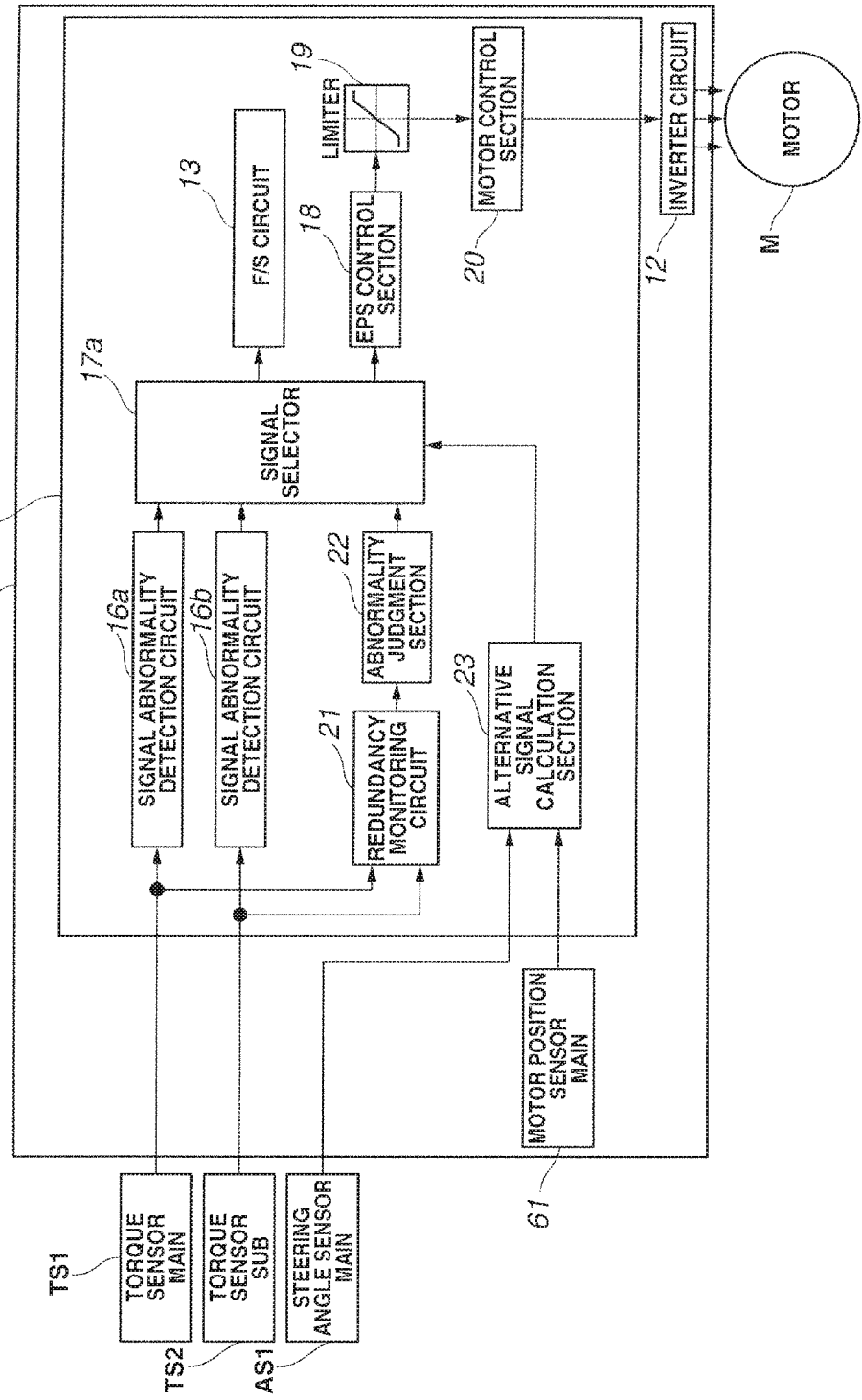
FIG. 11 is a control block diagram of a power steering device according to a second embodiment of the present invention.

As shown in FIG. 11, the ECU 4 of the second embodiment is different from that of the first embodiment in that the ECU 4 does not have signal abnormality detection circuits 16*c* to 16*f* and has a signal selector circuit 17*a*, a redundancy monitoring circuit 21, an abnormality judgment section 22 and an alternative signal calculation section 23 in place of the abnormal sensor selector circuit 17. The other configurations of the ECU 4 of the second embodiment are the same as those of the first embodiment.

The redundancy monitoring circuit 21 compares the steering torque detection signal Tt(Main) of the steering torque sensor unit TS1 with the steering torque detection signal Tt(Sub) of the steering torque sensor unit TS2 and, when an absolute difference between the steering torque detection signals is greater than or equal to a predetermined threshold value, detects the abnormality in the steering torque detection signal Tt(Main), Tt(Sub) of the steering torque sensor unit TS1, TS2.

The abnormality judgment section 22 judges the presence of the abnormality in the steering torque detection signal Tt(Main), Tt(Sub) of the steering torque sensor unit TS1, TS2 based on the abnormality detection result of the redundancy monitoring circuit 21.

The alternative signal calculation section 23 calculates an alternative signal, which is alternative to the steering torque detection signal Tt, based on the steering angle detection signal θs(Main) of the steering angle sensor unit AS1 and the motor position detection signal θm(Main) of the motor position sensor unit 61.

One example of calculation of the alternative signal will be explained below.

In the second embodiment, a calculated steering torque signal Tts is calculated as the alternative signal by multiplying the relative angle between upstream and downstream sides of the torsion bar by the torsional rigidity Ktb of the torsion bar. The steering angle detection signal θs(Main) is used as the angle of the upstream side of the torsion bar. The angle of the downstream side of the torsion bar (i.e. the angular position of the pinion shaft 2) is obtained by multiplying the steering angle detection signal θs(Main) by the reduction ratio Ng between the pinion shaft 2 and the motor shaft. Namely, the calculated steering torque signal Tts is given by the following equation.

$$Tts = Ktb \times (\theta s - \theta p) \quad (1)$$

Under normal circumstances, the signal selector circuit 17*a* outputs the steering torque detection signal Tt(Main) of the steering torque sensor unit TS1 to the EPS control section 18. When the abnormality is detected by the abnormality judgment section 22, the signal selector circuit 17*a* judges the presence or absence of the abnormality in the transmission state of the steering torque detection signal Tt(Main), Tt(Sub) of the steering torque sensor unit TS1, TS2 or the status of the steering torque sensor unit TS1, TS2.

Upon judging the presence of the abnormality, the signal selector circuit 17*a* outputs the steering torque detection signal of the steering angle sensor unit in which the abnormality is not present. Upon judging the absence of the abnormality, the signal selector circuit 17*a* outputs the calculated steering torque signal Tts to the EPS control section. Herein, the signal selector circuit 17*a* has an alternative signal receiver that receives the alternative signal outputted from the alternative signal calculation section 23.

Figure 12:
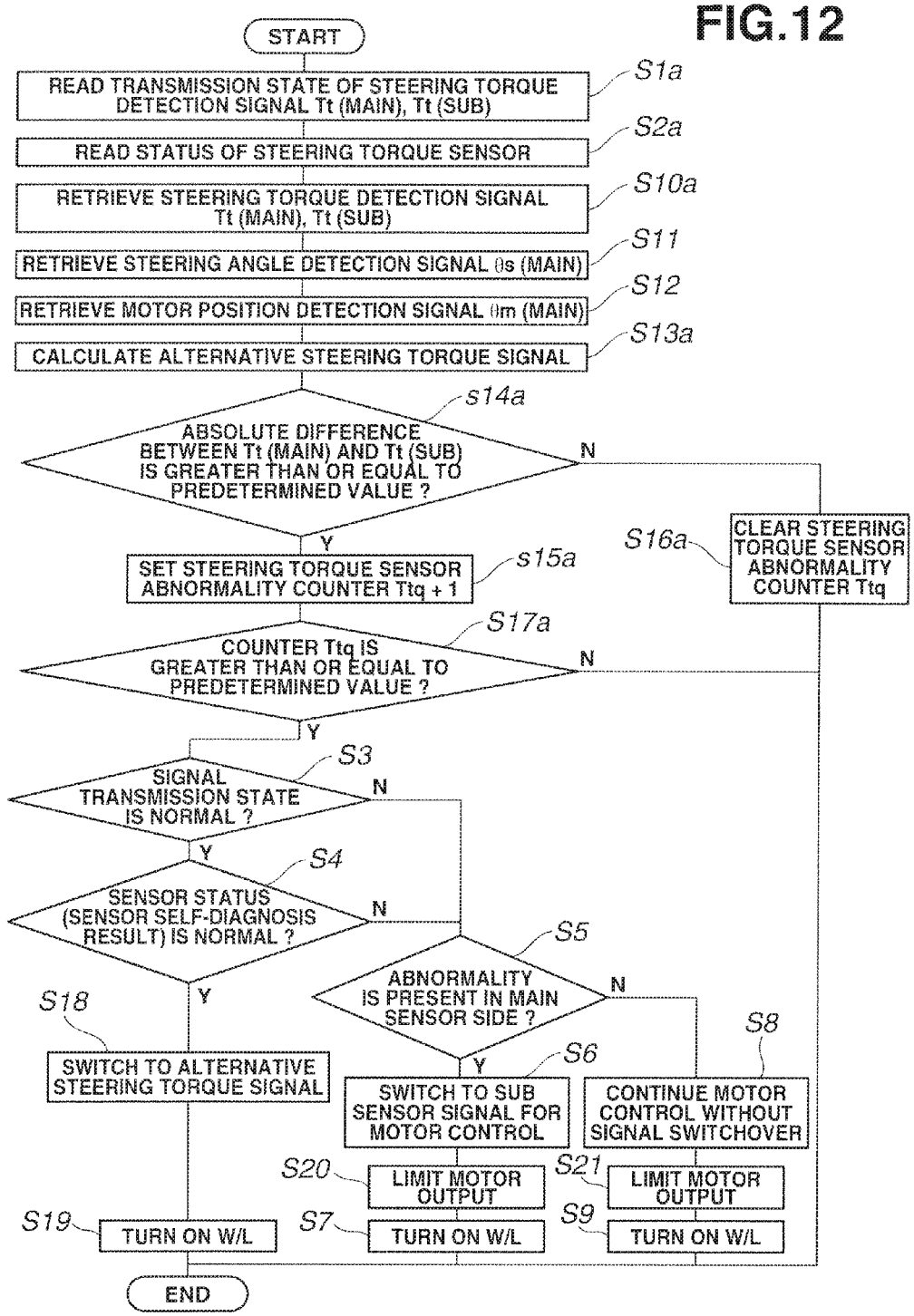
FIG. 12 is a flowchart of a signal abnormality detection process of the power steering device according to the second embodiment of the present invention.

The control process of the power steering device according to the second embodiment will be explained below with reference to a flowchart of FIG. 12.

The processing operations of steps S1*a* and S1*b* are the same as those of the first embodiment.

At step S10*a*, the CPU 9 retrieves the steering torque detection signals Tt(Main) and Tt(Sub) from the steering torque sensor units TS1 and TS2.

At step S11, the CPU 9 retrieves the steering angle detection signal θs(Main) from the steering angle sensor unit AS1.

At step S12, the CPU 9 retrieves the motor position detection signal θm(Main) from the motor position sensor unit 61.

At step S13*a*, the alternative signal calculation section 23 calculates the calculated steering torque signal Tts as the alternative signal.

At step S14*a*, the redundancy monitoring circuit 21 checks whether the absolute difference between the steering torque detection signals Tt(Main) and Tt(Sub) is greater than or equal to the predetermined threshold value. When the absolute difference is greater than or equal to the predetermined threshold value, the process goes to step S15*a*. At step S15*a*, the abnormality judgment section 22 increments the abnormality counter Ttq. Then, the process goes to step S17*a*. When the absolute difference is smaller than the predetermined threshold value, the process goes to step S16*a*. At step S16*a*, the abnormality judgment section 22 clears the abnormality counter Ttq.

At step S17*a*, the abnormality judgment portion 22 checks whether the abnormality counter Ttq is greater than or equal to a predetermined value. When the abnormality counter Ttq is greater than or equal to the predetermined value, the process goes to step S3. When the abnormality counter Ttq is smaller than the predetermined value, the process ends the current control cycle and returns to the start.

The processing operations of steps S3 and S4 are the same as those of the first embodiment.

When the sensor status is judged as normal at step S4, the process goes to step S18. At step S18, the signal selector circuit 17*a* switches to and uses the alterative signal for the motor control. Then, the fail-safe circuit 13 turns on the warning lamp so as to inform the driver of the presence of the abnormality.

At step S5, the signal selector circuit 17*a* judges whether the abnormal sensor unit (or signal) is the steering torque sensor unit TS1 (or the steering torque detection signal Tt(Main)). When the abnormal sensor unit (or signal) is the steering torque sensor unit TS1 (or the steering torque detection signal Tt(Main)), the process does to step S6. When the abnormal sensor (or signal) is not the steering torque sensor unit TS1 (or the steering torque detection signal Tt(Main)), the process does to step S8.

At step S6, the signal selector circuit 17*a* switches to and uses the steering torque detection signal Tt(Sub) for the motor control. The process exits after limiting the motor output at step S20 and turning on the warming lamp at step S7.

At step S8, the signal selector circuit 17*a* continues the use of the steering torque detection signal Tt(Main) for the motor control. The process exits after limiting the motor output at step S21 and turning on the warming lamp at step S9.

As described above, the power steering device of the second embodiment is characterized in that, even when the abnormality is detected in either one of the steer torque detection signals Tt(Main) and Tt(Sub), the motor control is continued according to the other steering torque detection signal. The steer torque detection signals Tt(Main) and Tt(Sub) are the same kind of vehicle operating condition signals. It is thus possible to, even when the abnormality is detected in one of these operating condition detection signals, continue the motor control according to the other operating condition detection signal.

Further, the redundancy monitoring circuit 21 is arranged to perform abnormality detection by comparison of the steering torque detection signals Tt(Main) and Tt(Sub). It is thus possible to detect the abnormality which has been undetectable by the respective abnormality judgment circuits and thereby possible to increase the accuracy of detection of the abnormality.

When the absolute difference between the steering torque detection signals Tt(Main) and Tt(Sub) is greater than or equal to the predetermined value, it is difficult to judge which of the detection signals is abnormal. In the second embodiment, the alternative signal is used when the absolute difference between the steering torque detection signals Tt(Main) and Tt(Sub) is greater than or equal to the predetermined value. It is thus possible to continue the motor control with more safety.

When the abnormality is present in at least one of the steering torque detection signals Tt(Main) and Tt(Sub), the steering assist force is decreased even during the use of the other steering torque detection signal. It is thus possible to ensure further safety in the motor control.

Since the steering condition detection signal is in the form of a serial data signal in which a given set of data items is transmitted in a predetermined sequence, it is possible to detect the abnormality in the steering condition sensor unit, the steering condition detection signal or the signal transmission circuit (such as pin or interface) by monitoring the presence/absence and sequence of the data items.

Furthermore, it is possible to further improve safety by stopping the steering assist when the absolute difference between the steering torque detection signals Tt(Main) and Tt(Sub) is greater than or equal to the predetermined value; and the abnormality is not detected in the steering torque detection signal Tt(Main), Tt(Sub) by the signal abnormality detection circuit 16*a*, 16*b*.

[Third Embodiment]

A power steering device according to the third embodiment of the present invention will be explained below. The third embodiment is similar to the first and second embodiments, except for the configurations of the ECU 4. Duplicate explanation will be hence omitted herefrom. In the third embodiment, the presence or absence of an abnormality in the motor position sensor units 61 and 62 and the motor position detection signals θm(Main) and θm(Sub) is detected. Further, a brushless motor is used as the electric motor in the third embodiment.

Figure 13:
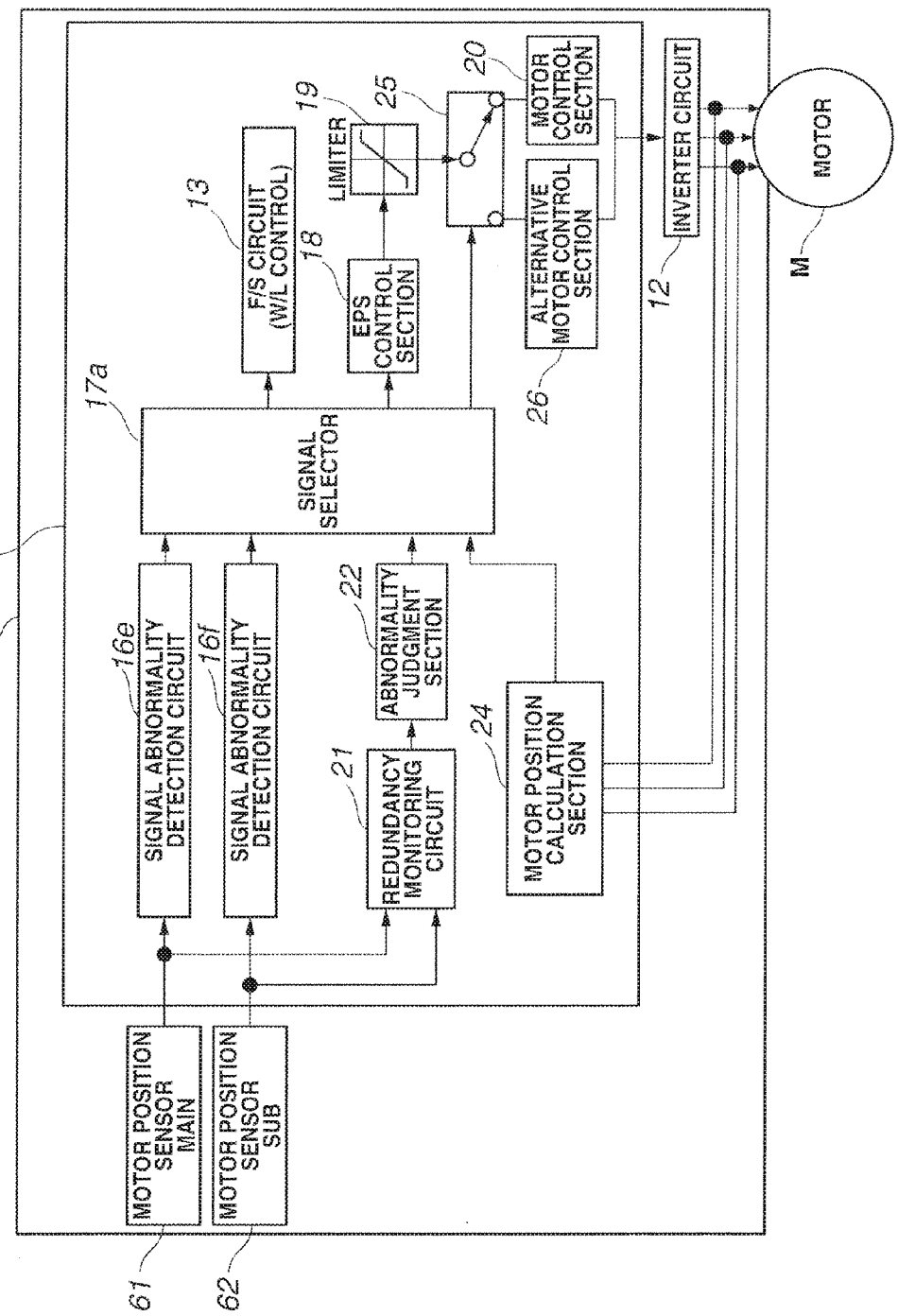
FIG. 13 is a control block diagram of a power steering device according to a third embodiment of the present invention.

In the ECU 4 of the third embodiment, the motor position detection signals θm(Main) and θm(Sub) of the motor position sensor units 61 and 62 are inputted into the CPU 9 as shown in FIG. 13. The ECU 4 of the third embodiment is different from that of the second embodiment in that the ECU 4 has a motor position calculation section 24 in place of the alternative signal calculation section 23 and additionally has a selector switch 25 and an alternative motor control section 26. The other configurations of the ECU 4 of the third embodiment are the same as those of the second embodiment.

The motor position calculates section 24 calculates the rotational position of the electric motor M by so-called sensor-less control based on a neutral point potential of the electric motor M, an induced voltage of the electric motor M, a magnetic saturation voltage of the electric motor M, a differential saliency of the electric motor M or a combination thereof.

The selector switch 25 receives the signal from the signal selector circuit 17a and makes a switchover between the motor control section 20 and the alternative motor control section 26. When the motor rotational position calculated by the motor position calculation section 24 is used for the motor control, the selector switch 25 switches to the alternative motor control section 26. The selector switch 25 switches to the motor control section 20 at all other times. The alternative motor control section 26 calculates and outputs the drive control signal based on the motor rotational position calculated by the motor position calculation section 24.

Figure 14:
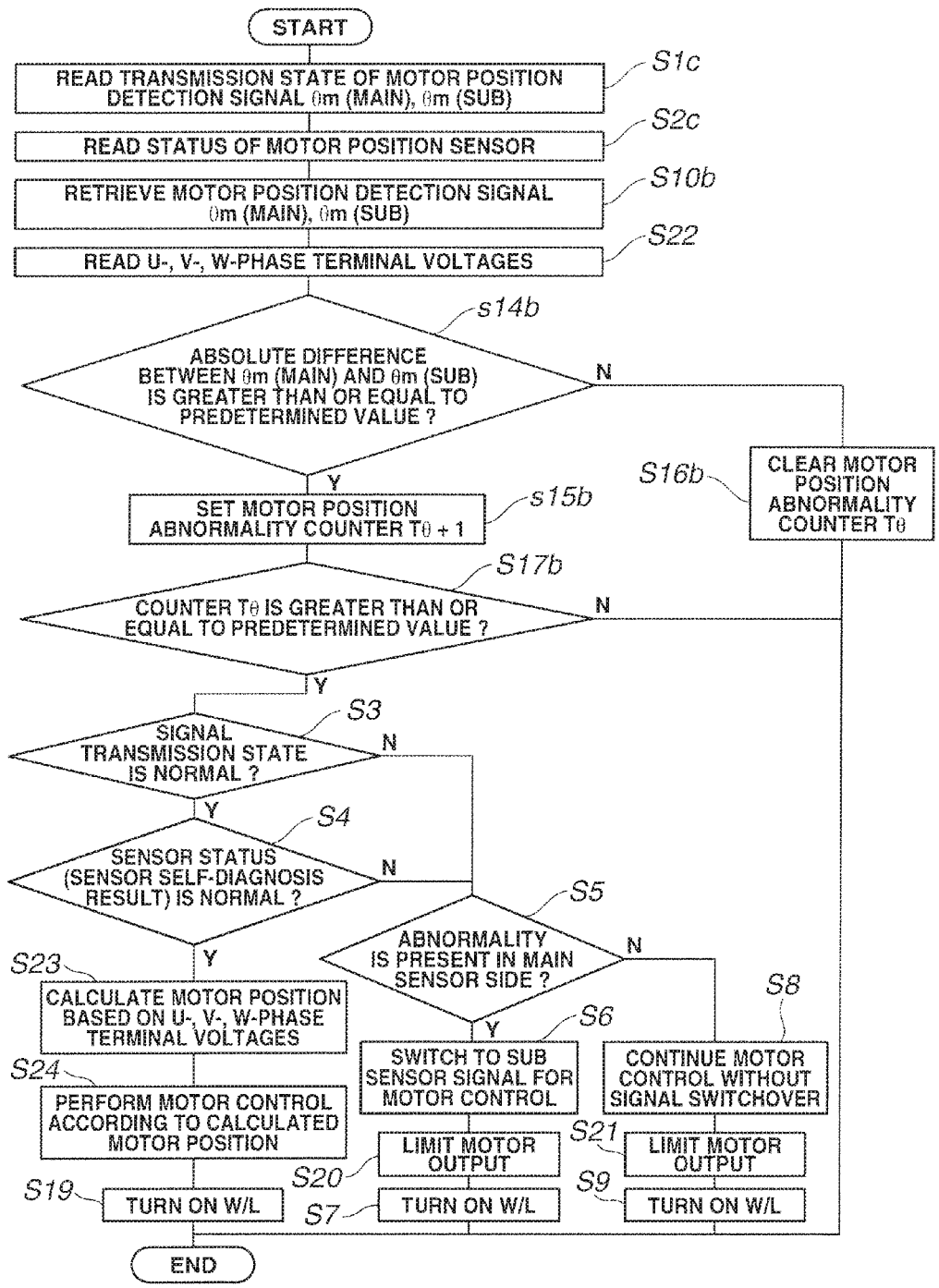
FIG. 14 is a flowchart of a signal abnormality detection process of the power steering device according to the third embodiment of the present invention.

The control process of the power steering device according to the third embodiment will be explained below with reference to a flowchart of FIG. 14.

The processing operations of steps S1c and S2c are the same as those of the first embodiment (see FIG. 10).

At step S10b, the CPU 9 retrieves the motor position detection signals θm(Main) and θm(Sub) from the motor position sensor units 61 and 62.

At step S22, the motor position calculation section 24 reads U-, V- and W-phase terminal voltages of the electric motor M.

The processing operations of steps S14b to S17b correspond to those in which the steering torque detection signals Tt(Main) and Tt(Sub) and the steering torque sensor abnormality counter Ttq in steps S14a to S17 of the second embodiment are replaced by the motor position detection signals θm(Main) and θm(Sub) and the motor position sensor abnormality counter Tθ.

The processing operations of steps S4 to S9 and S19 to S21 are the same as those of the second embodiment.

When the sensor status is judged as normal at step S4, the process goes to step S23. At step 23, the motor position calculation section 24 calculates the motor rotational position based on the U-, V- and W-phase motor terminal voltages.

At step S24, the alternative motor control section 26 controls the electric motor M in accordance with the motor rotational position calculated by the motor position calculation section 24. At step S19, the fail-safe circuit 13 turns on the warming lamp. Then, the process exits.

As described above, the power steering device of the third embodiment is characterized in that the sensor-less control technique is adopted so as to, even when the abnormality is detected in the motor position sensor unit, continue the motor control. It is thus possible in the third embodiment to obtain the same effects as in the second embodiment.

[Fourth Embodiment]

A power steering device according to the fourth embodiment of the present invention will be explained below. The fourth embodiment is similar to the first to third embodiments, except for the configurations of the ECU 4. Duplicate explanation will be hence omitted herefrom. In the fourth embodiment, the presence or absence of an abnormality in the steering angle sensor units AS1 and AS2 and the steering angle detection signals θs(main) and θs(sub) is detected.

Figure 15:
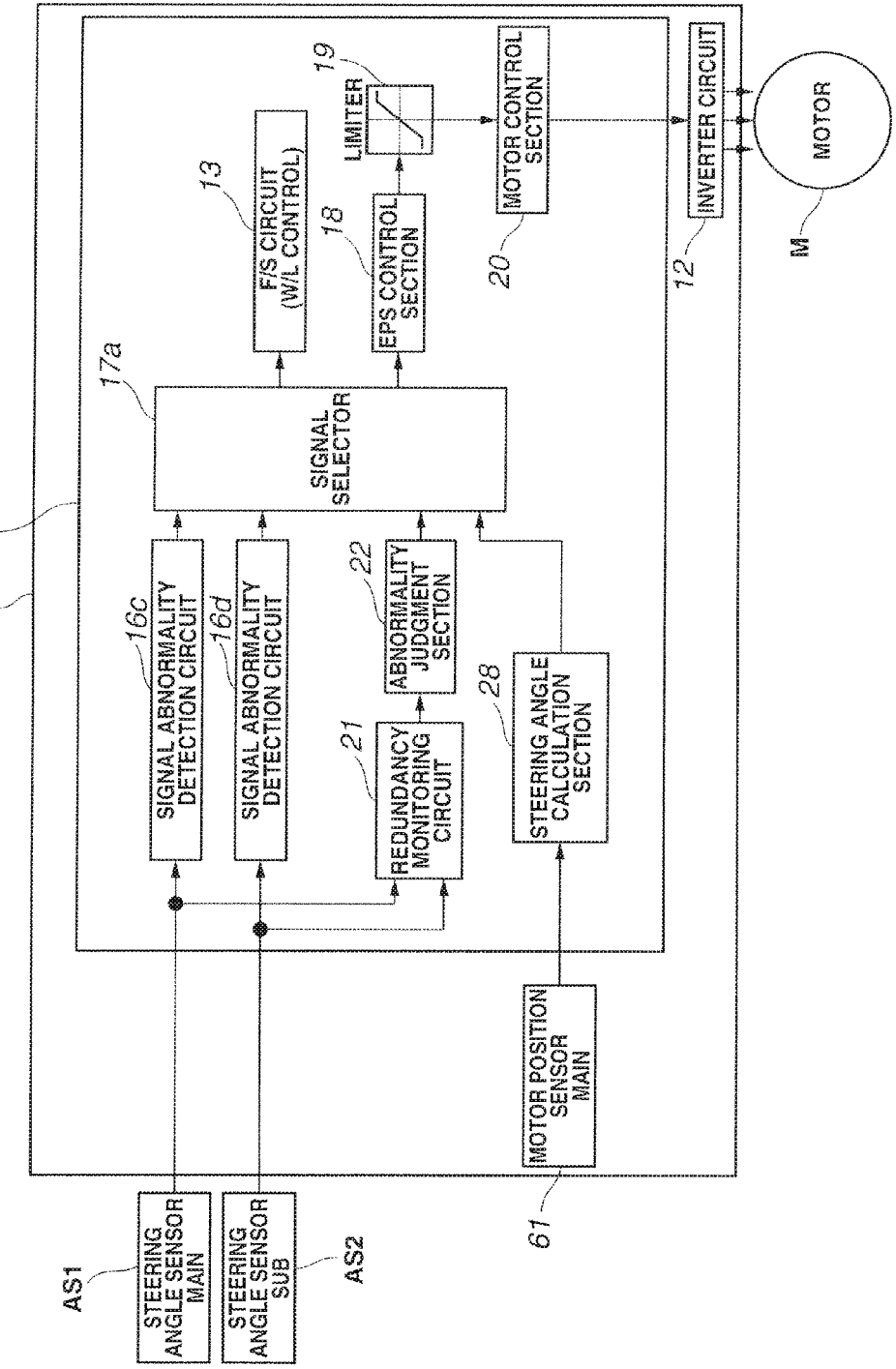
FIG. 15 is a control block diagram of a power steering device according to a fourth embodiment of the present invention.

In the ECU 4 of the fourth embodiment, the steering angle detection signals θs(Main) and θs(Sub) of the steering angle sensor units AS1 and AS2 are inputted into the CPU 9 as shown in FIG. 15. The ECU 4 of the fourth embodiment is different from that of the second embodiment in that the ECU 4 has a steering angle calculation section 28 in place of the alternative signal calculation section 23. The other configurations of the ECU 4 of the fourth embodiment are the same as those of the second embodiment.

The steering angle calculation section 28 calculates a steering angle signal. Examples of calculation of the steering angle signal will be explained below.

In the case where the steering angle sensor unit AS is located on the steerable wheel side with respect to the torsion bar, the steering angle signal θss (as the rotational angle at the pinion shaft 2) is calculated by multiplying the motor position detection signal θm(Main) by the reduction ratio Ng between the pinion shaft 2 and the motor shaft.

In the case where the steering angle sensor unit AS is located on the steering wheel side with respect to the torsion bar, the torsion angle T/Ktb of the torsion bar is first determined by dividing the steering torque detection signal Tt by the torsional rigidity Ktb of the torsion bar. Since the difference between the steering angle and the rotational angle θp of the pinion shaft 2 corresponds to the amount of torsion of the torsion bar, the steering angle signal θss (as the rotational angle at the pinion shaft 2) is calculated by adding the torsion angle T/Ktb of the torsion bar to the rotational angle θp of the pinion shaft 2.

In FIG. 15, the steering angle signal θss is calculated according to the motor position detection signal θm(Main) of the motor position sensor unit 61 as mentioned above. However, it is alternatively feasible to calculate the motor rotational position by sensor-less control based on the U-, V- and W-phase terminal voltages of the electric motor M as shown in FIG. 13, and then, calculate the steering angle signal θss according to the calculated motor rotational position.

The control process of the power steering device according to the fourth embodiment will be explained below with reference to a flowchart of FIG. 16.

The processing operations of steps S1b and S2b are the same as those of the first embodiment (see FIG. 9).

At step S10c, the CPU 9 retrieves the steering angle detection signals θs(Main) and θs(Sub) from the steering angle sensor units AS1 and AS2.

At step S12, the CPU retrieves the motor position detection signal θm(Main).

At step S28, the steering angle calculation section 28 calculates the steering angle signal θss as the alternative signal.

The processing operations of steps S14c to S17c correspond to those in which the steering torque detection signals Tt(Main) and Tt(Sub) and the steering torque sensor abnormality counter Ttq in steps S14a to S17 of the second embodiment are replaced by the steering angle detection signals θs(Main) and θs(Sub) and the motor position sensor abnormality counter Tθ.

The processing operations of steps S3 to S9 and S19 to S21 are the same as those of the second embodiment.

When the sensor status is judged as normal at step S4, the process goes to step S25. At step 25, the signal selector circuit 17a switches to the alterative signal for the motor control.

As described above, the power steering device of the fourth embodiment is characterized in that, even when the abnormality is detected in the steering angle sensor unit AS1, AS2 or the steering angle detection signal θs(Main), θs(Sub), the motor control is continued by the adoption of the sensor-less control technique. It is thus possible in the fourth embodiment embodiment to obtain the same effects as in the second and third embodiments.

Although the present invention has been described with reference to the above specific embodiments, it is apparent to those skilled in the art that: various modifications and variations of the embodiments are made within the technical spirit of the present invention; and such modifications and variations belong to the scope of the present invention.

For example, the present invention is applicable to abnormality detection of various operating condition detection systems for detecting in-vehicle device operating conditions (such as not only steering torque, steering angle and motor position, but also vehicle speed, yaw moment and the like) although the above first to fourth embodiments refers to abnormality detection of the steering condition detection sensor (steering torque sensor, steering angle sensor, motor position sensor).

The invention claimed is:

1. An controller of an in-vehicle device with an actuator, the controller comprising:
    an operating condition detection system that detects an vehicle operating condition and outputs first and second operating condition detection signals, said first and second operating condition detection signals being detected by and outputted from a plurality of respective detection elements or being detected by a common detection element and outputted through respective different electronic circuits;
    a first abnormality judgment circuit that judges the presence or absence of an abnormality in the first operating condition detection signal and, upon detection of an abnormality in the first operating condition detection signal, outputs the first operating condition detection signal with abnormality data contained therein as an output signal;
    a second abnormality judgment circuit that detects the presence or absence of an abnormality in the second operating condition detection signal and, upon detection of the abnormality in the second operating condition detection signal, outputs the second operating condition detection signal with abnormality data contained therein as an output signal;
    an ECU that performs drive control of the actuator;
    a signal abnormality detection circuit arranged in the ECU such that the signal abnormality detection circuit receives the output signals of the first and second abnormality judgment circuits and detects the presence or absence of an abnormality in the respective output signals of the first and second abnormality judgment circuits; and
    an actuator control circuit arranged in the ECU such that, when the signal abnormality detection circuit judges that no abnormality data is contained in the output signals of the first and second abnormality judgment circuits, the actuator control circuit calculates and outputs a drive control signal for drive control of the actuator in accordance with at least one of the output signals of the first and second abnormality judgment circuits and such that, when the signal abnormality detection circuit judges that the abnormality data is contained in one of the output signals of the first and second abnormality judgment circuits, the actuator control circuit calculates and outputs the drive control signal in accordance with the other of the output signals of the first and second abnormality judgment circuits.

2. The controller of the in-vehicle device according to claim 1, further comprising a redundancy monitoring circuit arranged in the ECU so as to detect the abnormality in the respective output signals of the first and second abnormality judgment circuits by comparison of the output signals of the first and second abnormality judgment circuits.

3. The controller of the in-vehicle device according to claim 2,
    wherein the ECU comprises an alternative signal receiver that receives an alternative signal usable as an alternative to the first and second operating condition detection signals; and
    wherein, when the redundancy monitoring circuit judges that an absolute difference between the output signals of the first and second abnormality judgment circuits is greater than or equal to a predetermined value, the actuator control circuit calculates and outputs the drive control signal in accordance with the alternative signal.

4. The controller of the in-vehicle device according to claim 2,
    wherein, when the signal abnormality detection circuit judges that the abnormality data is contained in one of the output signals of the first and second abnormality judgment circuits, the actuator control circuit calculates and outputs the drive control signal in accordance with the other of the output signals of the first and second abnormality judgment circuits such that an output of the drive control signal becomes smaller than when no abnormality data is contained in the output signals of the first and second abnormality judgment circuits.

5. The controller of the in-vehicle device according to claim 1,
    wherein each of the output signals of the first and second abnormality judgment circuits is in the form of a serial data signal that contains a trigger pulse indicating a start of signal transmission, an end pulse indicating an end of signal transmission and predetermined data provided between the trigger pulse and the end pulse and indicating the vehicle operating condition; and
    wherein the signal abnormality detection circuit detects the abnormality in the output signal of the first or second abnormality judgment circuit when the predetermined data is missing or is out of sequence in the output signal of the first or second abnormality judgment circuit.

6. A power steering device, comprising:
    a steering system that steers steerable wheels in response to steering operation of a steering wheel;
    an electric motor that applies a steering force to the steering system;
    a steering condition detection system that detects a steering condition and outputs first and second steering condition detection signals, said first and second steering condition detection signals being detected by and outputted from a plurality of respective detection elements or being detected by a common detection element and outputted through respective different electronic circuits;
    a first abnormality judgment circuit that judges the presence or absence of an abnormality in the first steering condition detection signal and, upon detection of an abnormality in the first steering condition detection signal, outputs the first steering condition detection signal with abnormality data contained therein as an output signal;

a second abnormality judgment circuit that detects the presence or absence of an abnormality in the second steering condition detection signal and, upon detection of the abnormality in the second steering condition detection signal, outputs the second steering condition detection signal with abnormality data contained therein as an output signal;

an ECU having a microprocessor that performs drive control of the electric motor;

a signal abnormality detection circuit arranged in the ECU such that the signal abnormality detection circuit receives the output signals of the first and second abnormality judgment circuits and detects the presence or absence of an abnormality in the respective output signals of the first and second abnormality judgment circuits; and a motor control circuit arranged in the ECU such that, when the signal abnormality detection circuit judges that no abnormality data is contained in the output signals of the first and second abnormality judgment circuits, the actuator control circuit calculates and outputs a drive control signal for drive control of the electric motor in accordance with at least one of the output signals of the first and second abnormality judgment circuits and such that, when the signal abnormality detection circuit judges that the abnormality data is contained in one of the output signals of the first and second abnormality judgment circuits, the actuator control circuit calculates and outputs the drive control signal in accordance with the other of the output signals of the first and second abnormality judgment circuits.

7. The power steering device according to claim 6, further comprising a redundancy monitoring circuit arranged in the ECU so as to judge the presence or absence of the abnormality in the respective output signals of the first and second abnormality judgment circuits by comparison of the output signals of the first and second abnormality judgment circuits.

8. The power steering device according to claim 7, wherein the ECU comprises an alternative signal receiver that receives an alternative signal usable as an alternative to the first and second steering condition detection signals; and wherein, when the redundancy monitoring circuit judges that an absolute difference between the output signals of the first and second abnormality judgment circuits is greater than or equal to a predetermined value, the motor control circuit calculates and outputs the drive control signal based on the alternative signal.

9. The power steering device according to claim 8, wherein the steering condition detection system is in the form of a torque sensor that detects a steering torque as the steering condition;

wherein the ECU further comprises:

a steering angle detection signal receiver that receives a steering angle detection signal indicating a rotational position of the steering wheel;

a motor position detection signal receiver that receives a motor position detection signal indicating a rotational position of the electric motor; and an alternative signal calculation section that calculates the alternative signal based on the steering angle detection signal and the motor position detection signal and outputs the alternative signal to the alternative signal receiver;

wherein, when the redundancy monitoring circuit judges that an absolute difference between the output signals of the first and second abnormality judgment circuits is greater than or equal to the predetermined value, the motor control circuit calculates and outputs the drive control signal based on the alternative signal.

10. The power steering device according to claim 8, wherein the steering condition detection system is in the form of a motor position sensor that detects a rotational position of the electric motor as the steering condition;

wherein the electric motor is in the form of a brushless motor;

wherein the ECU further comprises a motor position calculation section that calculates the rotational position of the electric motor based on a neutral point potential of the electric motor, an induced voltage of the electric motor, a magnetic saturation voltage of the electric motor, a differential saliency of the electric motor or a combination thereof, and then, outputs to the alternative signal receiver an output signal indicating the calculated rotational position of the electric motor; and wherein, when the redundancy monitoring circuit judges that an absolute difference between the output signals of the first and second abnormality judgment circuits is greater than or equal to the predetermined value, the motor control circuit calculates and outputs the drive control signal based on the output signal of the motor position calculation section.

11. The power steering device according to claim 8, wherein the steering condition detection system is in the form of a torque sensor that detects a steering torque as the steering condition;

wherein the electric motor is in the form of a brushless motor;

wherein the ECU further comprises a steering angle calculation section that calculates the steering angle based on a neutral point potential of the electric motor, an induced voltage of the electric motor, a magnetic saturation voltage of the electric motor, a differential saliency of the electric motor or a combination thereof, and then, outputs to the alternative signal receiver an output signal indicating the calculated steering angle; and wherein, when the redundancy monitoring circuit judges that the absolute difference between the output signals of the first and second abnormality judgment circuits is greater than or equal to the predetermined value, the motor control circuit calculates and outputs the drive control signal based on the output signal of the steering angle calculation section.

12. The power steering device according to claim 7, wherein, when the signal abnormality detection circuit judges that the abnormality data is contained in one of the output signals of the first and second abnormality judgment circuits, the actuator control circuit calculates and outputs the drive control signal in accordance with the other of the output signals of the first and second abnormality judgment circuits such that an output of the drive control signal becomes smaller than when no abnormality data is contained in the output signals of the first and second abnormality judgment circuits.

13. The power steering device according to claim 7,
wherein the motor control circuit sets the drive control signal to zero when the redundancy monitoring circuit judges that an absolute difference between the output signals of the first and second abnormality judgment circuits is greater than or equal to a predetermined value and the signal abnormality detection circuits judges that no abnormality data is contained in the output signals of the first and second abnormality judgment circuits.

14. The power steering device according to claim 6,
wherein each of the output signals of the first and second abnormality judgment circuits is in the form of a serial data signal that contains a trigger pulse indicating a start of signal transmission, an end pulse indicating an end of signal transmission and predetermined data provided between the trigger pulse and the end pulse and indicating the steering condition; and wherein the signal abnormality detection circuit detects the abnormality in the output signal of the first or second abnormality judgment circuit when the predetermined data is missing or is out of sequence in the output signal of the first or second abnormality judgment circuit.

* * * * *